US012117774B2

(12) United States Patent
Wharton et al.

(10) Patent No.: US 12,117,774 B2
(45) Date of Patent: Oct. 15, 2024

(54) MULTIPLE JUMP TIMEPIECE DISPLAY MECHANISM

(71) Applicant: Blancpain SA, Le Brassus (CH)

(72) Inventors: Kadmiel Wharton, L'Isle (CH); Laurent Rougny, Les Rousses (FR)

(73) Assignee: Blancpain SA, Le Brassus (CH)

( * ) Notice: Subject to any disclaimer, the term of this patent is extended or adjusted under 35 U.S.C. 154(b) by 450 days.

(21) Appl. No.: 17/501,102

(22) Filed: Oct. 14, 2021

(65) Prior Publication Data

US 2022/0197220 A1 Jun. 23, 2022

(30) Foreign Application Priority Data

Dec. 21, 2020 (EP) .................................... 20216197

(51) Int. Cl.
*G04B 19/24* (2006.01)
*G04B 19/02* (2006.01)

(52) U.S. Cl.
CPC ........... *G04B 19/241* (2013.01); *G04B 19/02* (2013.01)

(58) Field of Classification Search
None
See application file for complete search history.

(56) References Cited

FOREIGN PATENT DOCUMENTS

| | | | | |
|---|---|---|---|---|
| CH | 713 209 | A2 | 6/2018 | |
| CH | 715722 | A1 * | 7/2020 | ............. G04B 19/02 |
| CN | 101055463 | A | 10/2007 | |
| CN | 111522219 | A | 8/2020 | |
| EP | 1 351 104 | A1 | 10/2003 | |
| JP | 2007-501933 | A | 2/2007 | |
| KR | 10-2009-0031560 | A | 3/2009 | |

OTHER PUBLICATIONS

Translation of CH715722 Claims, Espacenet (Year: 2024).*
European Search Report issued Jun. 3, 2021 in European Application 20216197.2, filed on Dec. 21, 2020, 3 pages (with English Translation of Categories of Cited Documents).
Combined Chinese Office Action and Search Report issued Mar. 23, 2024, in corresponding Chinese Patent Application No. 202111607881.X (with Partial English Translation and English Translation of Category of Cited Documents), 8 pages.
Office Action issued Feb. 19, 2024, in corresponding Korean Patent Application No. 10-2021-0167467 (with English Translation), 16 pages.

* cited by examiner

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A multiple jump timepiece display mechanism includes a continuously rotating control wheel arranged to drive an indicator wheel carrying a display, either directly by the value of an elementary pitch PE by a direct or indirect continuous cooperation between the control wheel and the indicator wheel, or indirectly through a multiplier mechanism, by the combination of a device for disengaging the elementary pitch drive mechanism, and by driving the indicator wheel, in at least one disengaging position, by this multiplier mechanism driving it by an increased pitch PM greater than the elementary pitch PE or a multiple thereof.

12 Claims, 5 Drawing Sheets

MULTIPLE JUMP TIMEPIECE DISPLAY MECHANISM

CROSS-REFERENCE TO RELATED APPLICATION

This application claims priority to European Patent Application No. 20216197.2 filed on Dec. 21, 2020, the entire disclosure of which is hereby incorporated herein by reference.

TECHNICAL FIELD OF THE INVENTION

The invention relates to a multiple jump timepiece display mechanism, arranged to be driven by an input mobile moved by a movement, for the display of a variable over a plurality of discrete positions, by at least one display opposite a display scale, said discrete positions being separated two by two by intervals, each said interval being equal to an elementary pitch, or to an increased pitch greater than said elementary pitch, or to an integer multiple of said elementary pitch, and at least one said interval being different from the others.

The invention also relates to a timepiece, in particular a watch, including at least one such display mechanism.

The invention relates to the field of timepiece display mechanisms.

TECHNOLOGICAL BACK-GROUND

In most cases, timepieces have at least one display mechanism comprising an indicator which pivots concentrically at a graduation with which it cooperates. This display mechanism can in particular be used to display the hour or the date. In general, the graduation marks are distributed evenly around a circumference.

In the case of a central time or date display, that is to say when the indicator pivots at the centre of the movement of the timepiece, this indicator sweeps the entire dial, and risks to mask at a certain moment a complication or another display which would be placed in a sector of the dial.

In the case of an off-centre time or date display, that is to say when the indicator does not rotate at the centre of the movement of the timepiece, the indicator sweeps a circular surface of small diameter, generally lying between the centre of the movement and the outside diameter of the dial. The circumference of this surface being small, it is difficult to display all the marks of the graduation therein, especially if they are alphabetical or numerical marks. There are various means for overcoming this problem, in particular by using an alphabetical or numerical mark, every second graduation, and a shape mark, such as a point, line, or the like, for the other positions. This solution is very suitable for indications where the amount of graduations is an even number, but does not necessarily solve the problem when the amount of graduations is an odd number. Indeed, in such a case it is necessary to have the place to write the last graduation and the first one next to each other. Although it is possible to display all the digits, reading it can prove to be difficult for the user due to the proximity of the digits.

SUMMARY OF THE INVENTION

The invention proposes to provide a more universal display mechanism, wherein the marks of the graduation are not necessarily distributed uniformly over a circumference, but are disposed so that the angular distance separating two optional consecutive marks is greater than the angular distance separating the other marks.

To this end, the invention relates to a multiple jump timepiece display mechanism, arranged to be driven by an input mobile moved by a movement, for the display of a variable over a plurality of discrete positions, by at least one display opposite a display scale, said discrete positions being separated two by two by intervals, each interval being equal to an elementary pitch PE, or to an increased pitch PM greater than said elementary pitch PE, and at least one said interval being different from the others, characterised in that said mechanism includes a gear train for controlling the movement of said display, which includes a continuously rotating control wheel driven by said input mobile, and which is arranged to drive an indicator wheel carrying said at least one display, either through an elementary pitch drive mechanism, directly by the value of a said elementary pitch PE by a continuous cooperation, or indirectly through a multiplier mechanism, by a means for disengaging said elementary pitch drive mechanism, and by driving said indicator wheel, in at least one disengaging position, by said multiplier mechanism driving it by an increased pitch PM greater than the elementary pitch PE.

In particular embodiments, the invention may further include one or more of the following features, taken in isolation or in any technically possible combination.

In particular embodiments, the control wheel is arranged to drive the indicator wheel, either directly by the value of a said elementary pitch PE by a direct or indirect continuous cooperation between said control wheel and said indicator wheel, or indirectly through said multiplier mechanism by the value of an integer multiple of said elementary pitch, by said means for disengaging the elementary pitch drive mechanism, and by driving said indicator wheel, in at least one disengaging position, by said multiplier mechanism driving it by an increased pitch PM equal to said integer multiple of said elementary pitches PE, different from one.

In particular embodiments, the indicator wheel includes a coaxial and synchronous lower level having complete toothing and engaged with a first jumper for maintaining the display position and upper level cooperating with said control wheel over part of its circumference, and including a locally truncated toothing, each truncated area constituting a said disengagement means for interrupting the kinematic chain between said upper level and said control wheel.

In particular embodiments, the indicator wheel includes at least one carrier, arranged to cooperate with at least one multiple jump finger driven by said control wheel and which is arranged to push said at least one carrier to pivot said indicator wheel in an angular travel greater than the elementary travel corresponding to said elementary pitch PE, as long as said upper level and said control wheel are disengaged from each other.

In particular embodiments, the at least one multiple jump finger is arranged to push said at least one carrier to pivot said indicator wheel in an angular travel corresponding to an integer, different from one, of said elementary pitches, as long as said upper level and said control wheel are disengaged from each other.

In particular embodiments, the multiplier mechanism includes a multiple jump wheel, synchronous with said control wheel, which drives a multiplier gear train to which belongs a multiple jump setting-wheel which carries said at least one multiple jump finger.

In particular embodiments, the multiplier gear train includes, between said multiple jump wheel and said multiple jump setting-wheel, at least one intermediate multiple jump setting-wheel, and in that the number of teeth of the mobiles composing said multiplier gear train defines the ratio between said increased pitch PM and said elementary pitch PE.

In particular embodiments, the multiplier gear train includes, between said multiple jump wheel and said multiple jump setting-wheel, at least one intermediate multiple jump setting-wheel, and in that the number of teeth of the mobiles composing said multiplier gear train defines the value of said integer multiple of said elementary pitch.

In particular embodiments, the mechanism includes a multiple jump jumper which is arranged to maintain the position of said multiple jump wheel.

In particular embodiments, the multiple jump finger includes a plurality of elementary fingers each arranged to cooperate with a said carrier.

In particular embodiments, the indicator wheel includes a maximum number of teeth which is greater than the number of teeth included in said control wheel, and the difference in the number of teeth between said indicator wheel and said control wheel is the total of the numbers of teeth corresponding to the increased jumps made by said display over one revolution of said indicator wheel.

In particular embodiments, the mechanism is a date mechanism, and includes a said 31-teeth control wheel, and an indicator wheel which includes at least 32 teeth to clearly separate the display of the 31st day of the month and that of the first day of the following month.

According to another aspect, the present invention relates to a timepiece including at least one movement arranged for driving a display mechanism as described above included in said timepiece.

BRIEF DESCRIPTION OF THE FIGURES

Other features and advantages of the invention will become apparent upon reading the detailed description which follows, with reference to the appended drawings, where:

FIG. 4 shows the display of the date 29, the truncated area of the indicator wheel does not yet face the toothing of the control wheel, the multiple jump finger is in an angular position at 10 o'clock, and is still remote from the indicator wheel carrier;

FIG. 5 shows the display of the date 30, the truncated area of the indicator wheel faces the toothing of the control wheel, the multiple jump finger is in an angular position at 9 o'clock, and is still remote from the carrier of the indicator wheel;

FIG. 6 shows the display of the date 31, which corresponds to the position of FIGS. 1 and 2, the truncated area of the indicator wheel faces the toothing of the control wheel which can then no longer drive it, the multiple jump finger is in an angular position at 8 o'clock, and is in contact with the carrier of the indicator wheel, ready to initiate the multiple jump;

FIG. 7 shows the display of the date 1, the multiple jump of two elementary pitches has just been carried out, the truncated area of the indicator wheel is eclipsed relative to the toothing of the control wheel, which can now drive it, the multiple jump finger is in an angular position at 7 o'clock, and is close to leaving contact with the carrier of the indicator wheel;

FIG. 8 shows the date display 2, the truncated area of the indicator wheel has moved away from the toothing of the control wheel, which cooperates with the toothing of the upper level of the indicator wheel, the multiple jump finger is in an angular position at 6 o'clock, and can no longer interfere with the carrier of the indicator wheel until the following end of the month;

DETAILED DESCRIPTION OF THE INVENTION

Figure 1:
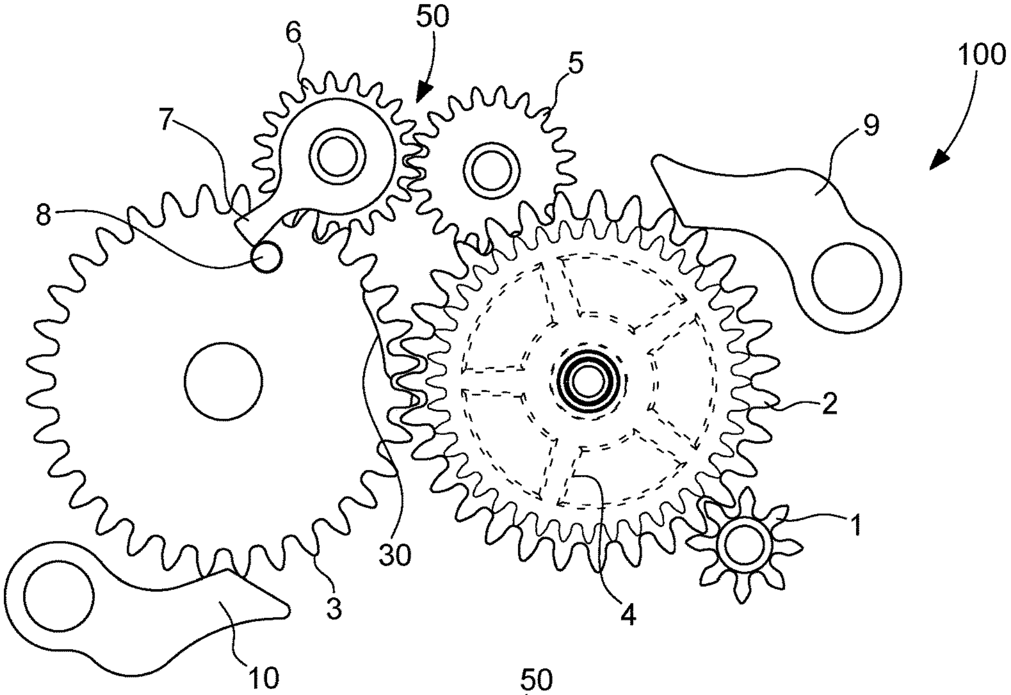
FIG. 1 shows, schematically and in plan view, a multiple jump timepiece display mechanism according to the invention, applied to a particular non-limiting case of display of a date, in a particular variant where this display jumps, between the mark "31" and the mark "1", by a space, called here not increased, larger than the spaces which are here equidistant separating the other marks called here not elementary. This mechanism includes an input mobile which is a drive pinion arranged to be driven by a horological movement, and which in turn drives a control wheel, which is here a thirty-one wheel, and which is integral with a multiple jump wheel which is coaxial therewith, and under the control wheel, and which is shown in this figure with its toothing in solid lines, and with its felloe and its arms in broken lines; this control wheel is held in position by a multiple jump jumper, the multiple jump wheel is thus also maintained in position. The control wheel cooperates with a date indicator wheel which carries a display visible in FIGS. 4 to 8. The mechanism according to the invention includes a disengagement mechanism which allows the date indicator wheel, in certain positions, not to be driven by the control wheel, this disengagement mechanism here includes a truncated area on an upper toothing level of the indicator wheel, which then only includes 29 teeth, while the lower level of the indicator wheel includes 32 teeth, which are identical to those of the higher level, according to the same pitch, and aligned with those which remain. This lower level constantly cooperates with a date indicator jumper, to hold the indicator wheel in position. The date indicator wheel also carries a carrier protruding, here without limitation, from its upper face. A second kinematic chain starts from the multiple jump wheel, which controls, via an intermediate multiple jump setting-wheel (whose mesh with the multiple jump wheel is not shown in this figure), the rotation of a multiple jump setting-wheel carrying a multiple jump finger, which can, in some respective angular positions, push the carrier of the date indicator wheel, to cause the latter to rotate by a certain angular value. In the example illustrated, the combination of the toothings of the gear train of the second kinematic chain is such that the pressure of the carrier controls a rotation of the indicator wheel with an increased pitch which is double the elementary pitch.
Figure 2:
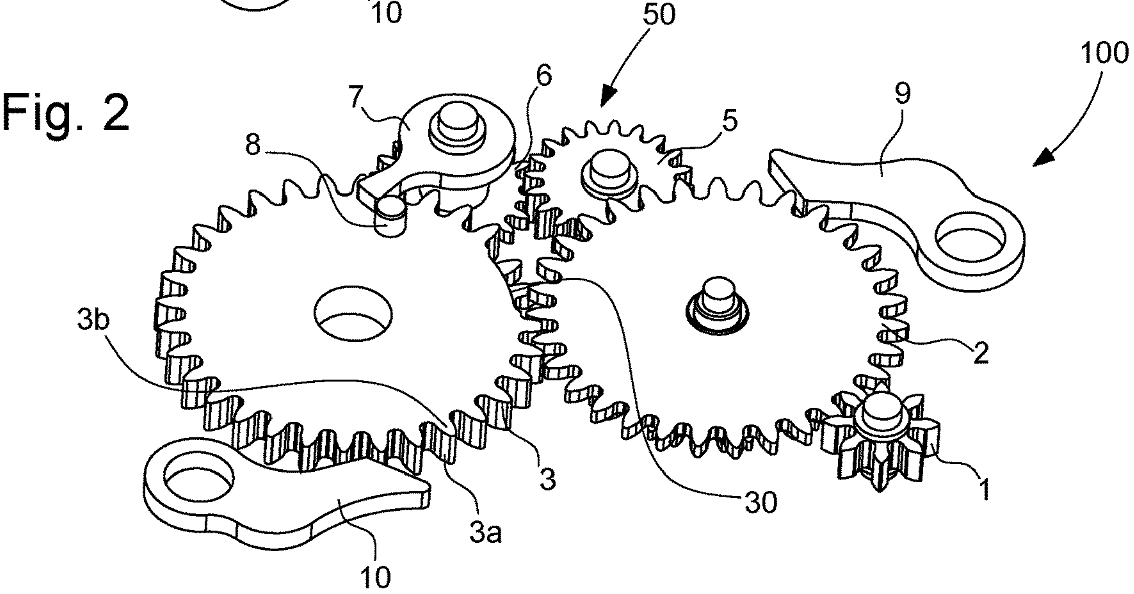
FIG. 2 shows, schematically and in perspective, the mechanism of FIG. 1, in the same configuration where the multiple jump finger contacts the carrier of the date indicator wheel.
Figure 3:
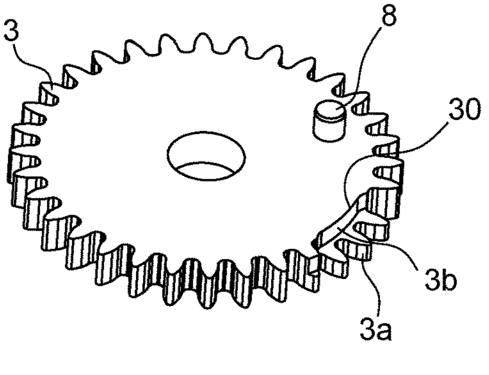
FIG. 3 shows, schematically and in perspective, the date indicator wheel alone.
Figure 12:
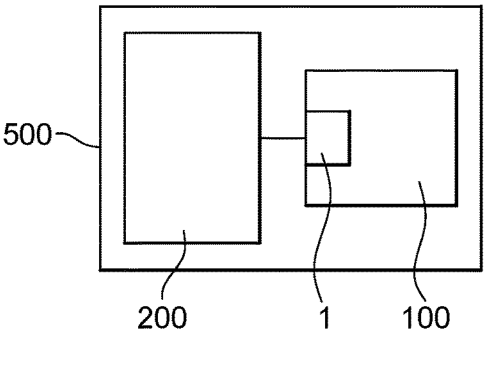
FIG. 12 is a block diagram showing a watch including a movement which drives the input mobile of a multiple jump display mechanism according to the invention.
Figure 4:
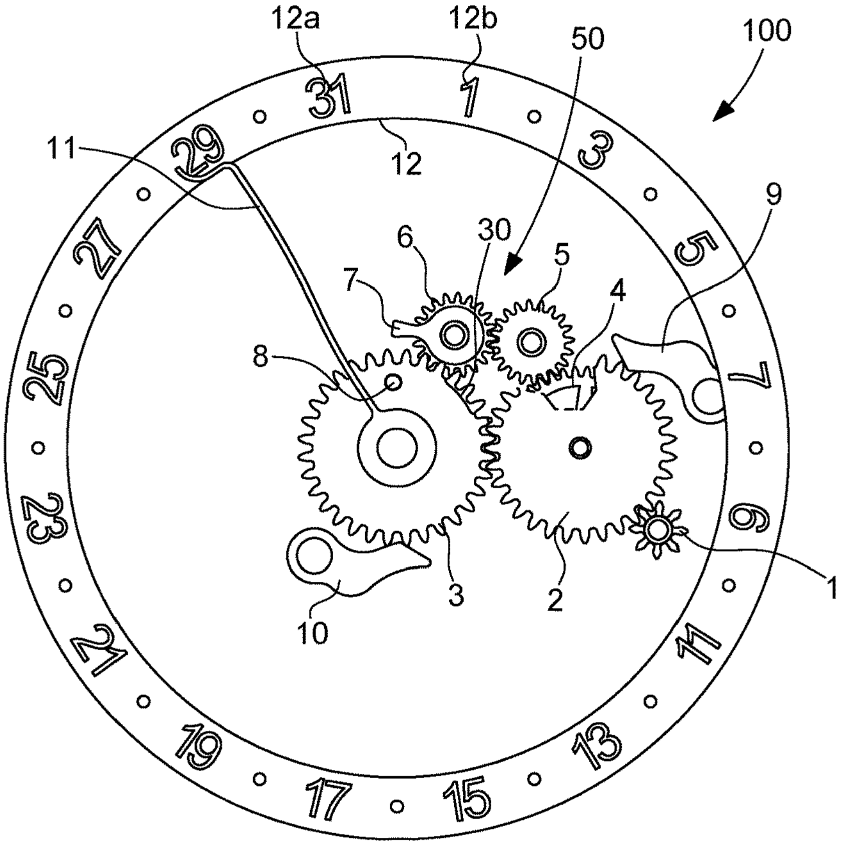
FIGS. 4 to 8 show, schematically and in plan view, the evolution of the cooperation of the mobiles of the same mechanism, and the associated evolution of the display performed by a display which is a hand mounted integral with the date indicator wheel, facing a dial carrying a display scale with numerical markers for odd-numbered date days, separated by single dots for even-numbered date days; this display scale includes a constant elementary pitch for the intervals between the markers of the days from 1 to 31, and an increased interval, which is here twice the previous one, between the marks 31 and 1. In these figures the control wheel is partially cut to show the multiple jump wheel and its mesh with the intermediate multiple jump setting-wheel.
Figure 5:
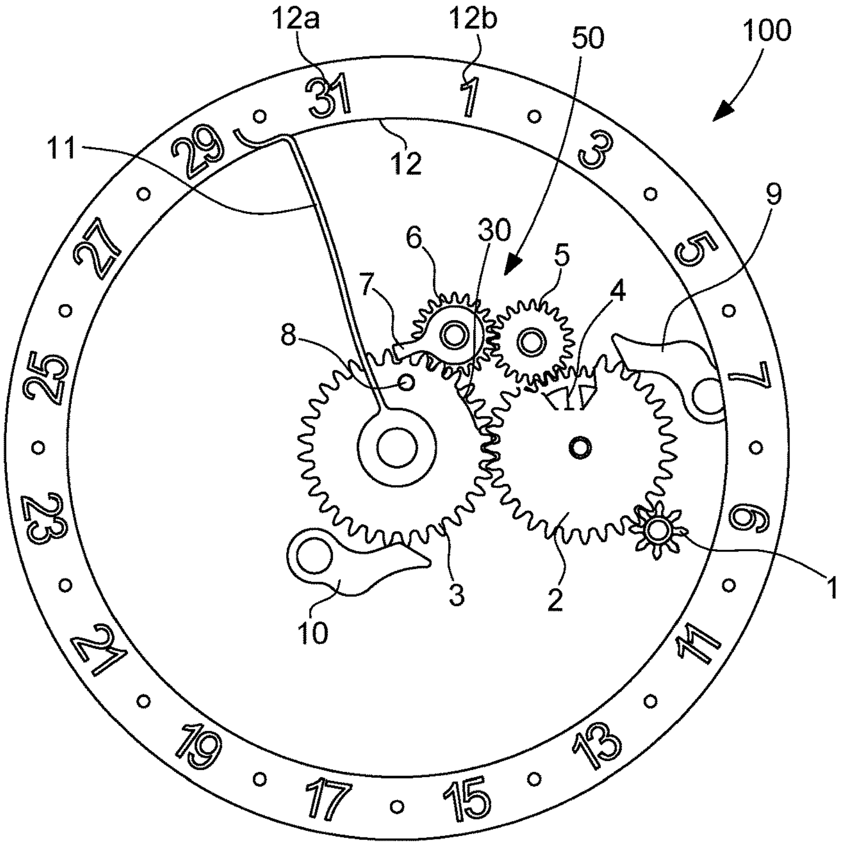
Figure 6:
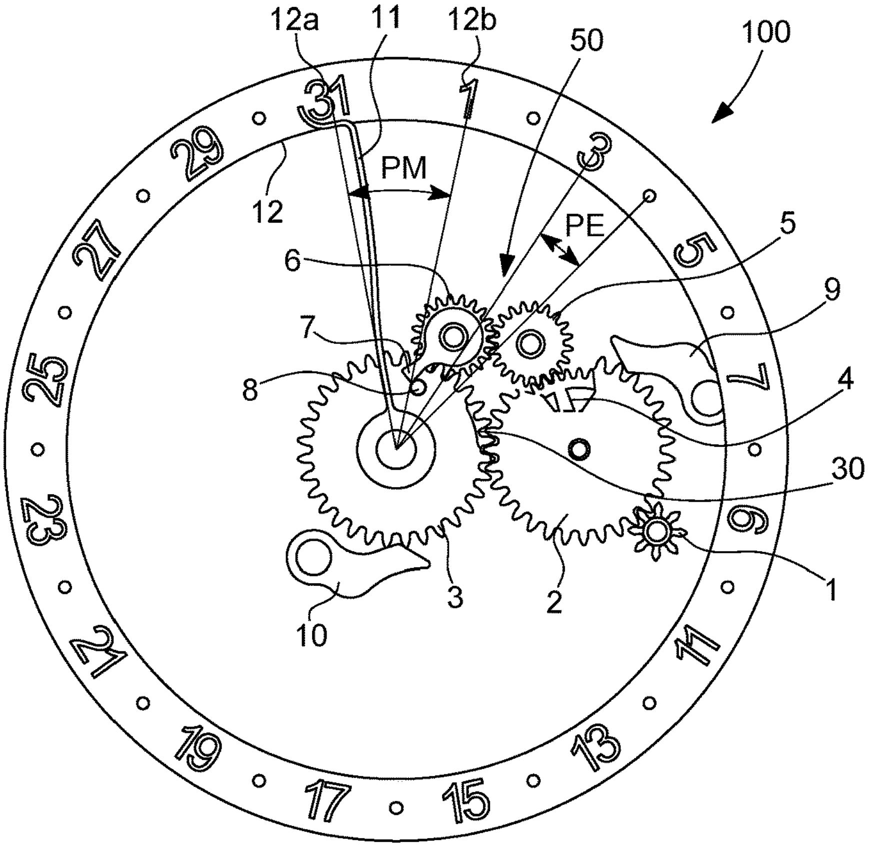
Figure 7:
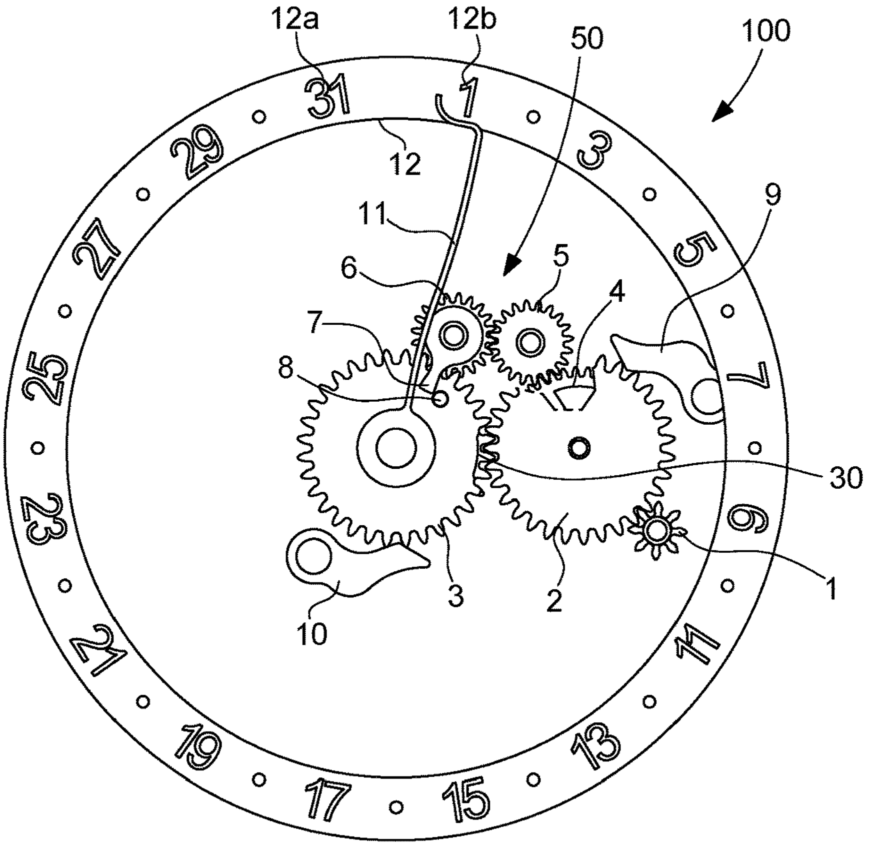
Figure 8:
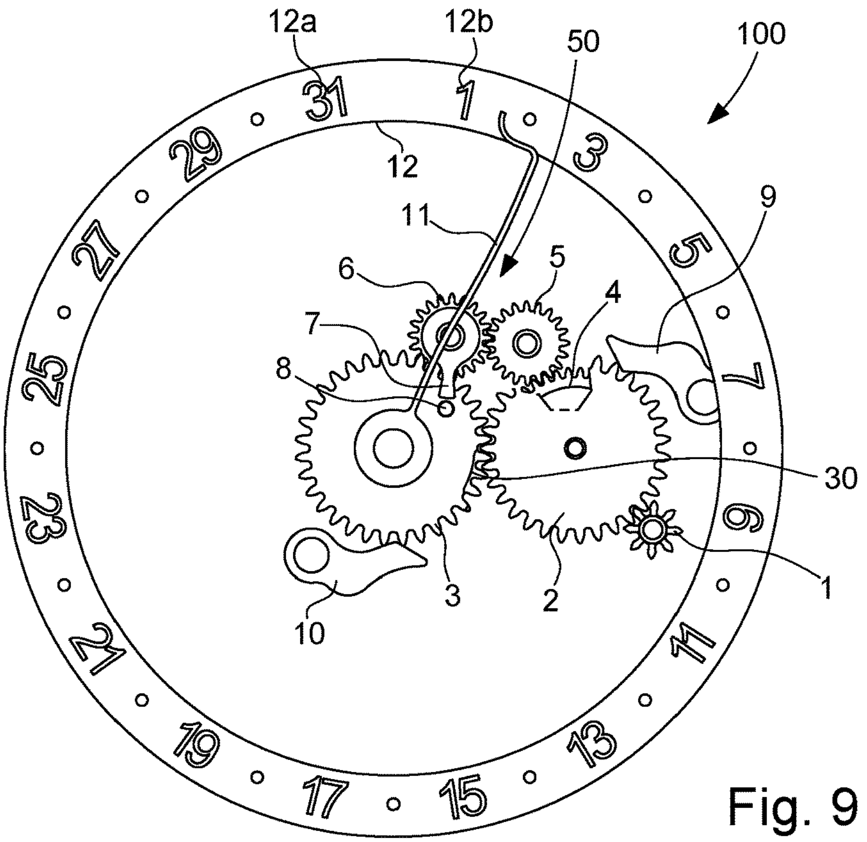
Figure 9:
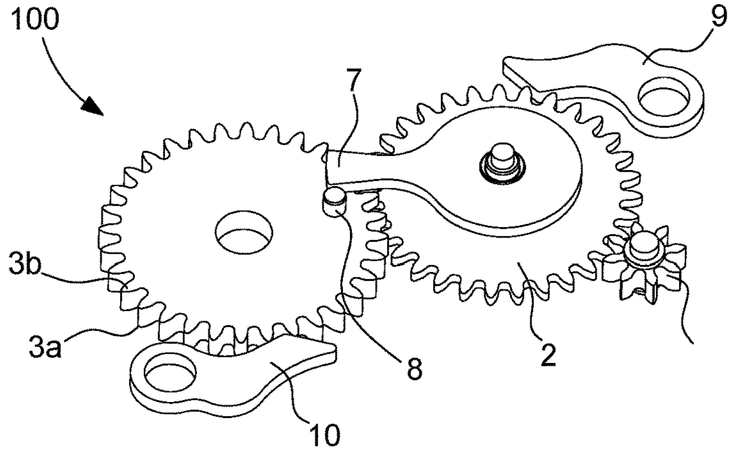
FIG. 9 shows, schematically and in perspective, another variant of the multiple jump display mechanism, where the multiple jump finger is carried by the control wheel, and here contacts the carrier of the date indicator wheel.
Figure 10:
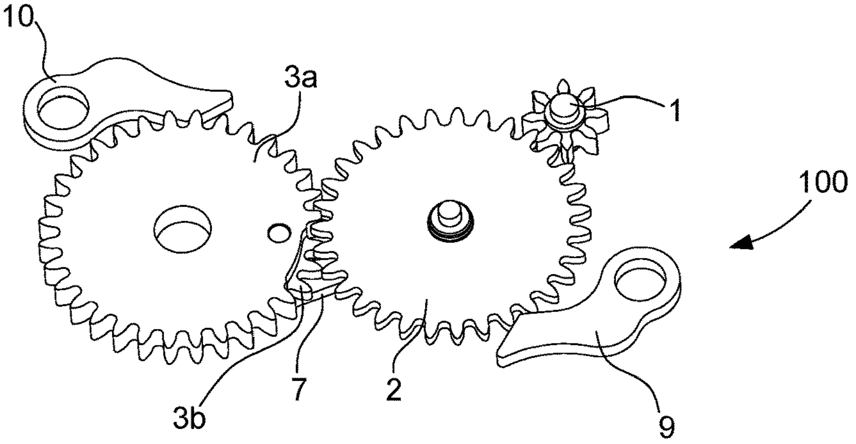
FIG. 10 shows, schematically and in perspective, the other side of the variant of FIG. 9.

The invention relates to a timepiece display mechanism 100, arranged to be driven by an input mobile 1 moved by a movement 200, for the display of a variable over a plurality of discrete positions. This display is performed by at least one display 11, such as a hand, opposite a display scale 12, the discrete positions 12*a*, 12*b* being separated two by two by intervals. Each interval is equal to an elementary pitch PE, or to an increased pitch PM greater than the elementary pitch PE, and in particular equal to an integer multiple of the elementary pitch, and at least one interval is different from the others.

According to the invention, the mechanism 100 includes a gear train for controlling the movement of the display 11. This gear train includes a control wheel 2 in continuous rotation, driven directly or indirectly by the input mobile 1 or constituting the input mobile 1. This control wheel 2 is arranged to drive an indicator wheel 3 carrying a display 11, either directly by the value of an elementary pitch PE by a direct or indirect continuous cooperation between the control wheel 2 and the indicator wheel 3, or indirectly through a multiplier mechanism 50, by the combination of a means for disengaging the elementary pitch drive mechanism, and by driving the indicator wheel 3, in at least one disengaging position, by the multiplier mechanism 50 driving it by an increased pitch PM greater than the elementary pitch PE.

More particularly, the control wheel 2 is arranged to drive the indicator wheel 3, either directly by the value of an elementary pitch PE by a direct or indirect continuous cooperation between the control wheel 2 and the indicator wheel 3, or indirectly through a multiplier mechanism 50 by the value of an integer multiple of the elementary pitch, by the combination of a means for disengaging the elementary pitch drive mechanism, and by driving the indicator wheel 3, in at least one disengaging position, by the multiplier mechanism 50 driving it by an increased pitch PM equal to an integer number of elementary pitches PE, different from one.

More particularly, the indicator wheel 3 includes a coaxial and synchronous lower level 3*a* having complete toothing and engaged with a first jumper 10 for maintaining the display position and upper level 3*b* cooperating directly or via a direct gear train with the control wheel 2 over part of its circumference, and including a locally truncated toothing, each truncated area 30 constituting a disengagement means for interrupting the kinematic chain between the upper level 3*b* and the control wheel 2. The lower level 3*a* and upper level 3*b* can in particular form a one-piece assembly.

More particularly, the indicator wheel 3, and for example in the case of the figures the upper level 3*b*, includes at least one carrier 8, 80, which is arranged to cooperate with at least one multiple jump finger 7 driven directly or indirectly by the control wheel 2 and which is arranged to push this at least one carrier 8, 80, to pivot the indicator wheel 3 in an angular travel greater than the elementary travel corresponding to the elementary pitch PE, as long as the upper level 3*b* and the control wheel 2 are disengaged from each other.

More particularly, the at least one multiple jump finger 7 is arranged to push this at least one carrier 8, 80, to pivot the indicator wheel 3 in an angular travel corresponding to an integer, different from one, of elementary pitches, as long as the upper level 3*b* and the control wheel 2 are disengaged from each other.

More particularly, the multiplier mechanism 50 includes a multiple jump wheel 4, synchronous with the control wheel 2, which drives a multiplier gear train to which belongs a multiple jump setting-wheel 6 which carries the at least one multiple jump finger 7.

More particularly, the multiplier gear train includes, between the multiple jump wheel 4 and the multiple jump setting-wheel 6, at least one intermediate multiple jump setting-wheel 5, and the number of teeth of the mobiles composing the multiplier gear train defines the ratio between the increased pitch PM and the elementary pitch PE.

More particularly still, the multiplier gear train includes, between the multiple jump wheel 4 and the multiple jump setting-wheel 6, at least one intermediate multiple jump setting-wheel 5, and the number of teeth of the mobiles composing the multiplier gear train defines the value of the integer multiple of the elementary pitch.

More particularly, the mechanism 100 includes a multiple jump jumper 9, which is arranged to maintain the position of the control wheel 2, and therefore that of the multiple jump wheel 4.

More particularly, the multiple jump finger 7 includes a plurality of elementary fingers 70, each arranged to cooperate with a carrier 8, 80.

More particularly, the indicator wheel 3 includes a maximum number of teeth which is greater than the number of teeth included in the control wheel 2, and the difference in the number of teeth between the indicator wheel 3 and the control wheel 2 is the total of the numbers of teeth corresponding to the increased jumps made by the display 11 over one revolution of the indicator wheel 3.

More particularly, the mechanism 100 is a date mechanism, and includes a 31-teeth control wheel 2, and an indicator wheel 3 which includes at least 32 teeth to clearly separate the display of the 31$^{st}$ day of the month and that of the first day of the following month.

The invention also relates to a timepiece 500 including at least one movement 200 arranged for driving such a display mechanism 100, included in the timepiece 500.

The figures illustrate a particular and non-limiting variant of the invention, which is illustrated for the application to the display of a date. The following description mentions a double jump when the display performs an increased pitch PM, that is to say an angular displacement greater than the elementary pitch PE. This example is in no way limiting because the jump can be of a different value, and in particular, in the preferred application where the increased pitch PM is a multiple of the elementary pitch PE, triple, quadruple or more.

The input mobile 1 is here a drive pinion, which is driven one pitch per day by a horological movement 200.

The control wheel 2 is here a thirty-one wheel, having 31 teeth, and which is driven by the drive pinion 1 and held in place by a multiple jump jumper 9 which is a thirty-one jumper. The control wheel 2 therefore performs one jump per day, and one revolution per month, which corresponds to the standard date.

The indicator wheel 3 is here a date indication wheel, which is driven by the control wheel 2, and is held in place by the first jumper 10 which is a date indication jumper. The indicator wheel 3 has 32 teeth, and is composed of two levels. The lower level 3*a* is complete and includes these 32 teeth, and is in permanent contact with the first jumper 10 which holds it in position. The upper level 3*b*, in contact with the control wheel 2 which drives it, has a clearance 30, here on 3 teeth, in order to allow a double jump at the desired moment without driving the control wheel 2.

The multiple jump wheel 4, which is integral with the control wheel 2, drives the intermediate multiple jump setting-wheel 5, which in turn drives the multiple jump setting-wheel 6 integral with the multiple jump finger 7. The gear ratio between the multiple jump wheel 4 and the multiple jump setting-wheel 6 sets the rotational speed of the multiple jump finger 7. This gear ratio must be an integer in order to ensure a position of the multiple jump finger 7 identical to each complete or partial revolution of the control wheel 2, for this particular application. In this example, a ratio of 1/2 has been selected in order to have twice the speed on the multiple jump finger 7.

A carrier 8 is here, without limitation, constituted by a pin, which is integral with the indicator wheel 3, and is arranged so as to be driven by the multiple jump finger 7 when the control wheel 2 cannot drive the indicator wheel 3 due to the presence of the clearance 30 on the upper level 3*b* of said indicator wheel. Since the rotational speed of the multiple jump finger 7 is higher than the rotational speed of the control wheel 2, this results in a double jump for the indicator wheel 3, while the control wheel 2 makes only one jump. The mechanism then returns to the starting position and a new cycle can thus begin for the control wheel 2 which will again drive the indicator wheel 3 step by step.

Of course, some components of the mechanism can be combined to form one-piece assemblies, for example the carrier 8 can be integral with the indicator wheel 3.

The date markers 12 are disposed so that the angular distance PM separating the markers 12*a* of the day according to the mark "31" and 12*b* of the day according to the mark "1" is greater than the angular distance PE separating the others markers.

The date indicating hand 11, integral with the indicator wheel 3, pivots concentrically to the date markers 12. The date indicating hand 11 is located facing the mark 12*a* of the day according to the mark "31" when the mechanism is positioned just before the double jump, and will therefore perform a greater angular displacement during the next jump to thus be directly facing the mark 12*b* of the day according to the mark "1".

The angular displacements of the date indicating hand 11 are therefore regular throughout the revolution of the latter until arriving opposite the day mark 12*a* according to the mark "31", and thus performing a greater angular displacement between the marks 12*a* of the day according to the mark "31" and 12*b* of the day according to the mark "1".

The invention is advantageous because it is easily adaptable to different types of displays.

In particular, the angular distance of the largest jump can be selected by modifying the number of teeth of the indicator wheel 3, the position of the pin 8, the shape of the multiple jump finger 7, as well as its rotational speed using the gear ratio between the multiple jump wheel 4 and the multiple jump setting-wheel 6.

Figure 11:
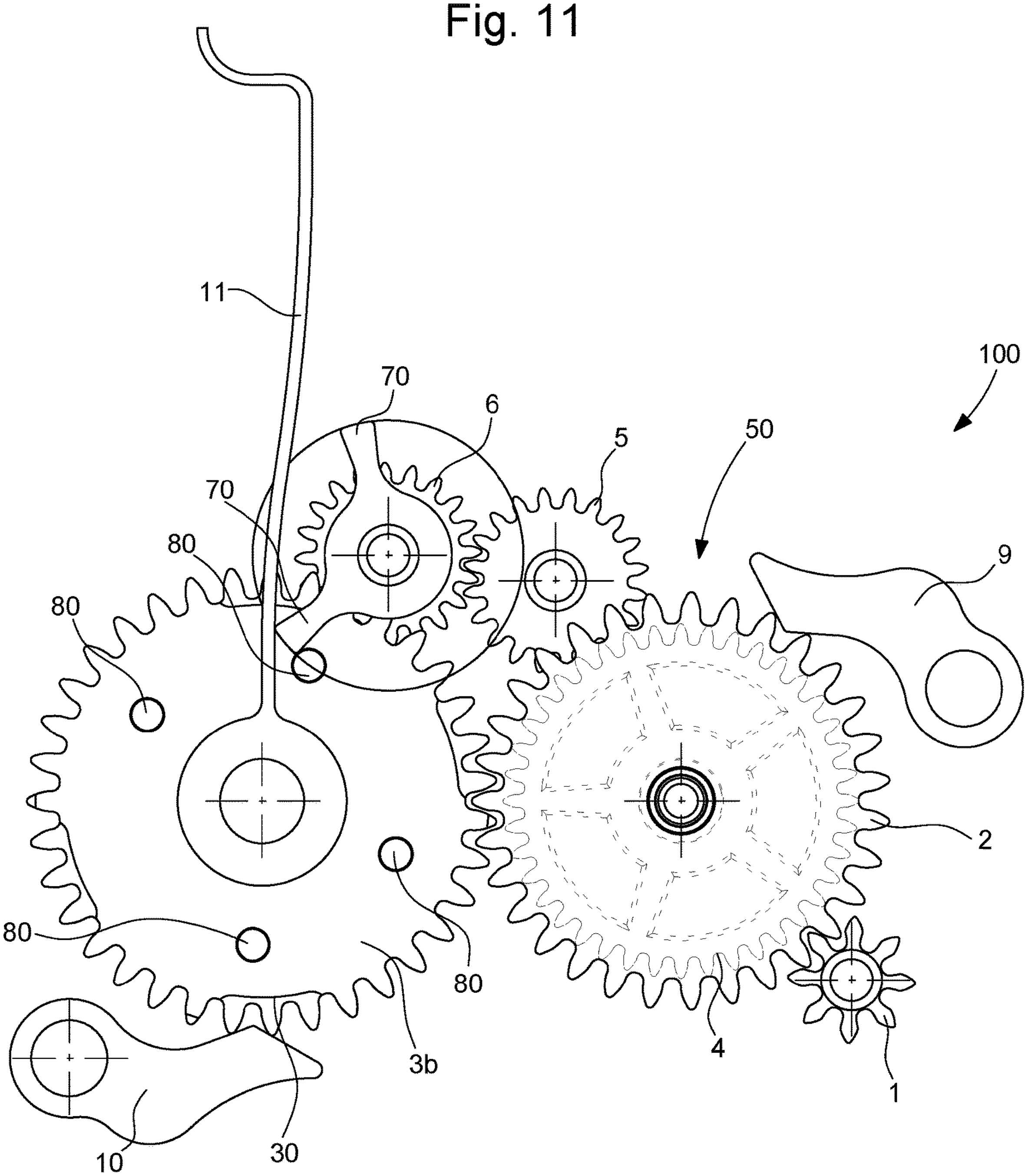
FIG. 11 shows, schematically and in plan view, yet another variant of the multiple jump display mechanism, where the indicator wheel includes several truncated areas and several carriers, and where the multiple jump finger includes a plurality of elementary fingers, one of which here contacts one of the carriers of the date indicator wheel.

It is also possible to multiply the number of multiple jump fingers 7 and of pins 8, so that the date indicating hand 11 performs several increased pitch jumps during its revolution, as can be seen in FIG. 11, which illustrates a particular non-limiting embodiment, and which includes a 35-teeth control wheel 2 to allow the execution of four jumps, in connection with four clearances 30 and four carriers 80, the multiple jump setting-wheel 6 in turn including two multiple jump fingers 70. The gear ratio between the multiple jump wheel 4 and the multiple jump setting-wheel 6 should be selected accordingly.

It is, again, possible to eliminate the auxiliary gear train formed by the set of mobiles 4, 5 and 6, and to secure the multiple jump finger 7 directly to the thirty-one wheel 2.

The invention claimed is:

1. A multiple jump timepiece display mechanism, arranged to be driven by an input mobile moved by a movement, for the display of a variable over a plurality of discrete positions, by at least one display opposite a display scale, said discrete positions being separated two by two by intervals, each interval being equal to an elementary pitch PE, or to an increased pitch PM greater than said elementary pitch PE, or to an integer multiple of said elementary pitch PE, and at least one said interval being different from the others, said mechanism comprising:

a gear train for controlling the movement of said display, which comprises a continuously rotating control wheel driven directly or indirectly by said input mobile or constituting said input mobile, and which is arranged to drive an indicator wheel carrying said at least one display, either through an elementary pitch drive mechanism, directly by the value of said elementary pitch PE by a direct or indirect continuous cooperation, or indirectly through a multiplier mechanism, by a means for disengaging said elementary pitch drive mechanism, and by driving said indicator wheel, in at least one disengaging position, by said multiplier mechanism driving it by said increased pitch PM greater than the elementary pitch PE, said indicator wheel including a coaxial and synchronous lower level having complete toothing and engaged with a first jumper for maintaining the display position and upper level cooperating directly or via a direct gear train with said control wheel over part of a circumference of the control wheel, and including a locally truncated toothing, each truncated area constituting said means for disengaging for interrupting the kinematic chain between said upper level and said control wheel.

2. The display mechanism according to claim 1, wherein said control wheel is arranged to drive said indicator wheel, either directly by the value of a said elementary pitch PE by a direct or indirect continuous cooperation between said control wheel and said indicator wheel, or indirectly through said multiplier mechanism by the value of an integer multiple of said elementary pitch PE, by said means for disengaging the elementary pitch drive mechanism, and by driving said indicator wheel, in at least one said disengaging position, by said multiplier mechanism driving it by an increased pitch PM equal to said integer multiple of said elementary pitches PE, different from one.

3. The display mechanism according to claim 2, wherein said indicator wheel comprises at least one carrier, arranged to cooperate with at least one multiple jump finger driven directly or indirectly by said control wheel and which is arranged to push said at least one carrier to pivot said indicator wheel in an angular travel greater than an elementary travel corresponding to said elementary pitch PE, as long as said upper level and said control wheel are disengaged from each other.

4. The display mechanism according to claim 3, wherein said at least one multiple jump finger is arranged to push said at least one carrier to pivot said indicator wheel in an angular travel corresponding to an integer multiple, different from one, of said elementary pitches, as long as said upper level and said control wheel are disengaged from each other.

5. The display mechanism according to claim 3, wherein said multiple jump finger comprises a plurality of elementary fingers each arranged to cooperate with a said carrier.

6. He display mechanism according to claim 3, wherein said multiplier mechanism comprises a multiple jump wheel, synchronous with said control wheel, which drives a multiplier gear train to which belongs a multiple jump setting-wheel which carries said at least one multiple jump finger.

7. The display mechanism according to claim 6, wherein said multiplier gear train comprises, between said multiple jump wheel and said multiple jump setting-wheel, at least one intermediate multiple jump setting-wheel, and wherein a number of teeth of the wheels composing said multiplier gear train defines the ratio between said increased pitch PM and said elementary pitch PE.

8. The display mechanism according to claim 6, wherein said multiplier gear train comprises, between said multiple jump wheel and said multiple jump setting-wheel, at least one intermediate multiple jump setting-wheel, and wherein a number of teeth of the wheels composing said multiplier gear train defines the value of said integer multiple of said elementary pitch.

9. The display mechanism according to claim 6, wherein said mechanism comprises a multiple jump jumper which is arranged to maintain a position of said multiple jump wheel.

10. The display mechanism according to claim 1, wherein said complete toothing of said indicator wheel comprises a maximum number of teeth which is greater than a number of teeth included in said control wheel, and the difference in a number of teeth between said indicator wheel and said control wheel is the total of a number of teeth corresponding to the increased jumps made by said display over one revolution of said indicator wheel.

11. The display mechanism according to claim 1, wherein said mechanism is a date mechanism, and comprises a 31-teeth control wheel, and said indicator wheel which comprises at least 32 teeth to separate the display of the 31st day of the month and that of the first day of the following month.

12. A timepiece comprising at least one movement arranged for driving the display mechanism according to claim 1, included in said timepiece.

* * * * *